United States Patent Office 2,959,531
Patented Nov. 8, 1960

2,959,531

SOLID RESINS FROM IRRADIATED EPOXIDIZED LIQUID CONJUGATED DIENE POLYMERS

Charles E. Wheelock, Bartlesville, Okla., assignor to Phillips Petroleum Company, a corporation of Delaware No Drawing. Filed Aug. 1, 1956, Ser. No. 601,360

11 Claims. (Cl. 204—158)

This invention relates to the production of solid resins by irradiating epoxidized liquid conjugated diene polymers.

In recent years, considerable work has been done toward developing liquid polymers of conjugated dienes. These liquid polymers can be prepared by various methods, such as by mass polymerization using finely divided sodium as a catalyst. It has also been found that such liquid polymers can be epoxidized to provide materials having desirable properties. In accordance with the present invention, it has been discovered that such epoxidized liquid conjugated diene polymers can be cured advantageously by subjecting same to radiation and/or to a combination of heat and radiation. The flexural strength, rigidity and ability to resist heat distortion of the cured material are improved by this curing process.

Accordingly, it is an object of this invention to provide novel solid resins of epoxidized conjugated diene polymers.

Another object is to provide methods of producing solid resins from liquid conjugated diene polymers by the use of radiation.

Other objects, advantages, and features of the invention should become apparent from the following detailed description of present preferred embodiments of the invention.

The polymeric starting materials applicable in this invention are liquid homopolymers and copolymers of conjugated dienes. As used herein, the term "polymer" is intended to mean both homopolymer and copolymer. These polymers are prepared by polymerization of conjugated dienes alone, with other conjugated dienes, or with one or more other copolymerizable materials. When copolymers are prepared, at least 50 weight percent of the monomers charged to the polymerization reaction zone are conjugated dienes. The preferred conjugated dienes are those which contain from four to six carbon atoms per molecule, but dienes containing eight or even twelve carbon atoms per molecule are applicable. Examples of suitable conjugated dienes include 1,3-butadiene, isoprene, 1,3-pentadiene, 2-methyl-1,3-pentadiene, 2,3-dimethyl-1,3-butadiene, and the like. Monomers copolymerizable with such conjugated dienes include styrene, alpha-methylstyrene, alpha-methyl-para-methylstyrene, halogenated styrenes such as 2-chlorostyrene and 3-bromostyrene, acrylonitrile, methacrylonitrile, acrylic and methacrylic acid esters such as methyl acrylate and methyl methacrylate, fumaric acid esters such as ethyl fumarate, unsaturated ketones such as methyl vinyl ketone and methyl isopropenyl ketone, and similar materials.

This invention is particularly applicable to the production of resins from liquid homopolymers and copolymers of 1,3-butadiene. These polymers are formed from monomers containing at least 50 parts by weight of butadiene per 100 parts of total monomers.

The liquid polymers can be prepared by any method known in the art, such as by a mass polymerization process using finely divided sodium as the catalyst, for example. One convenient method of polymerization is that disclosed in U.S. Patent 2,631,175. The resulting liquid polymers have a viscosity in the range of 100 to 6000 or higher Saybolt Furol seconds at 100° F., and generally have a molecular weight in the range of 300 to 3000.

The liquid polymers can be epoxidized directly following their recovery from the polymerization operation, or they can first be treated to remove any volatile materials or low molecular weight polymers which may be present. This treatment comprises stripping the polymer with an inert medium or gas, such as nitrogen, steam, carbon dioxide, or oxygen-free flue gas, as is more fully described in the copending application of Crouch and Edmonds, Serial No. 483,162, filed January 20, 1955, and now U.S. Patent No. 2,826,565. Another method of treatment comprises extraction of the liquid polymer with a liquefied paraffin or monoolefin containing from one to five carbon atoms per molecule. This latter procedure is described in the copending application of Wheelock, Serial No. 485,050, filed January 31, 1955.

Epoxidation of the liquid conjugated diene polymers can be effected by any known method. For example, the polymers can be treated with a variety of organic peracids, such as performic acid, peracetic acid, perpropionic acid, perbenzoic acid, and perphthalic acid. One specific treating method comprises effecting the epoxidation under anhydrous conditions in the presence of a solution of peracetic acid in glacial acetic acid. The epoxidation reaction can be carried out at temperatures generally in the range of 0 to 40° C. If an ion resin technique such as disclosed in U.S. Patent 2,458,484, is employed to prepare the peracid, temperatures as high as 80° C. can be employed in the epoxidation reaction. The time required for the reaction is generally in the range of ½ to 40 hours. The ratio of reactants determines, to a large extent, the percentage of epoxy or oxirane oxygen in the product. In general, the ratio by weight of organic peracid to liquid diene polymer is in the range of 0.2/1.0 to 2.0/1.0, although lower and higher ratios can be employed. It is preferred that the epoxidized liquid diene polymer contain from about ½₅ to 1 oxirane oxygen atom per double bond of the original polymer.

The epoxidized polymers can be used alone, or they can be blended with resinous materials such as phenol-formaldehyde resins, urea-formaldehyde resins, or melamine-formaldehyde resins, or with synthetic rubbers such as polybutadiene, butadiene-styrene copolymers, butadiene-acrylonitrile copolymers, and the like. Various fillers including clay, titanium dioxide, and diatomaceous earth can also be blended with the polymers. Such fillers are of value in certain applications, particularly since they reduce shrinkage during curing. Reinforcing agents such as glass fiber and asbestos can also be employed to form certain desired compositions.

The curing of the epoxidized polymers, or epoxidized polymers blended with any of the aforementioned materials, can be effected by irradiation alone. In another mode of operation, the composition is first subjected to heat treatment to effect partial curing and is then irradiated. A third procedure is to irradiate first and then subject the irradiated composition to heat treatment. Curing catalysts can be employed in the curing steps to reduce the curing time. Such catalysts include: alkali metal hydroxides, such as sodium and potassium hydroxides; acids, such as phosphoric acid; polyfunctional aliphatic amines, such as diethylenetriamine; Friedel-Crafts catalysts, such as aluminum chloride, zinc chloride, and complexes of these catalysts; ethers; anhydrides; amides; and the like. These catalysts can be employed in amounts from 1 to 20 percent by weight of the composition.

The curing, exclusive of that which occurs as a result of irradiation, is usually effected at temperatures in the range of 70 to 400° F., preferably above 100° F., for a time in the range of ½ to 48 hours. The temperature and time are chosen in accordance with the composition being treated and upon the extent to which the material is irradiated. The amount of heat treatment required is an inverse function of the radiation dosage.

The irradiation can advantageously be conducted by placing the material adjacent a spent fuel element or group of fuel elements after their withdrawal from a nuclear reactor. Such irradiation can conveniently be carried out while the elements are "cooling off" in a canal adjacent the reactor, which canal is filled with deionized water. The fuel elements can be any suitable type which are capable of producing radiation intensities within the range herein specified. In one specific example described hereinafter, these fuel elements comprised a series of uranium plates enriched in uranium-235. The plates were provided with thin aluminum coating sheets.

The material to be irradiated in accordance with this invention is placed sufficiently close to the fuel elements or other radiation source to obtain a dosage of $10^3$ to $10^{10}$ roentgens per hour, with a total dosage of $10^5$ to $10^{11}$ roentgens. The radiation produced by the spent fuel elements previously described is predominantly gamma rays. However, other types of radiation, such as beta particles, alpha particles, X-rays, neutrons, or any high energy particles, can be employed, provided the prescribed radiation intensity and dosage are utilized. These various types of radiation are referred to hereinafter as "high energy ionizing radiation." The time of the radiation can vary from a few seconds to several hours, provided also that the prescribed dosage and radiation intensity are maintained.

The radiation is conveniently conducted at room temperature, although temperatures which depart substantially from room temperatures can be employed if desired.

The irradiated epoxidized polymers of the type herein described are valuable for use in coating compositions, potting compositions, adhesives, and in the production of castings and laminates. Castings of epoxidized liquid polybutadiene containing diethylenetriamine, when thermally cured and then irradiated, have a higher flexural strength, greater rigidity, and higher heat distortion temperature than corresponding castings which have been cured, but not irradiated.

The following example is illustrative of this invention. Liquid polybutadiene was prepared by the process of U.S. Patent 2,631,175, using finely divided sodium as the catalyst. The products from a series of runs were blended to give a polybutadiene having the following characteristics.

| | |
|---|---:|
| API gravity, 60° F.[1] | 24.3 |
| Specific gravity, 60° F.[2] | 0.9083 |
| Density at 60° F., lbs./gal. | 7.5 |
| Refractive index, n 20/D[3] | 1.5198 |
| Iodine number[4] | 325 |
| Ash, wt. percent[5] | 0.05 |
| Gardner color[6] | 11 |
| Volatile material, wt. percent[7] | 1.0 |
| Viscosity, Saybolt Furol seconds at 100° F.[8] | 1500 |

[1] ASTM D287–54.
[2] ASTM D287–54.
[3] ASTM D1218–52T.
[4] ASTM D555–54.
[5] ASTM D128–47 (paragraph 6a, alternate method).
[6] ASTM D154–50.
[7] Sample is heated at 300° F. for 15 minutes at an absolute pressure of 10 mm. of mercury. The loss in weight is recorded as the percent of volatile material.
[8] ASTM D88–53.

This liquid polybutadiene was epoxidized using the following proportions of materials:

| | |
|---|---:|
| Liquid polybutadiene, grams | 432 |
| Chloroform, ml. | 2000 |
| Glacial acetic acid, ml. | 35 |
| Amberlite IR–120,[1] grams | 280 |
| Albone 50,[2] grams | 266 |

[1] Sulfonated polystyrene; acid-type cation exchange agent. Treated by washing with water, 10 percent HCl, water, and 10 percent NaCl, and repeating the cycle four times. The material was filtered, dried, soaked in glacial acetic acid, filtered, and the excess acid removed under pressure of a filter dam.
[2] Commercial 50 percent $H_2O_2$.

The liquid polybutadiene, chloroform, glacial acetic acid, Amberlite IR–120, and one-third of the Albone 50 were charged to a reactor provided with a stirrer. A bath set at 43° C. was used to control the temperature. The remainder of the Albone 50 was added in two equal portions at 5-minute intervals, the total quantity having been introduced after 10 minutes. The total reaction time was 2.5 hours. The mixture was stirred during this period and the temperature did not exceed 55° C. The reactor contents were cooled, the catalyst was separated by filtration, and the organic phase was washed with water and then with dilute sodium bicarbonate solution until the acid had been removed. The organic phase was then dried over anhydrous sodium sulfate, filtered to remove the sodium sulfate, and the chloroform was stripped under vacuum at 60° C. Analysis of the epoxidized resin gave 6.7 weight percent of oxirane oxygen and 10.3 weight percent of total oxygen.

Castings were prepared from the epoxidized liquid polybutadiene using 8 grams of diethylenetriamine per 40 grams of the epoxidized polymer. The castings were prepared in glass tubes using silicone stopcock grease as a parting agent. The castings were degassed under vacuum at 60° C. and were then precured at 100° C. for 16 hours. Bars were cut from the castings to provide samples ½" x ½" x 5–6".

These bars were wrapped in aluminum foil, placed in aluminum cans containing nitrogen at a pressure of 15 p.s.i.g., and irradiated in a field of gamma rays from spent fuel elements from the Materials Testing Reactor at Arco, Idaho. The spent fuel elements were disposed in the canal at a temperature of approximately 75° F. This reactor is described in Nucleonics, vol. 12, No. 4, pages 21–26, April 1954. The samples in the three cans received irradiation dosages as follows:

| Can No. | Dosage Rate, Roentgens/Hr. | Exposure Time, Hrs. | Total Dosage, Roentgens |
|---|---|---|---|
| 1 | $4.80 \times 10^6$ | 2.10 | $1.01 \times 10^7$ |
| 2 | $6.54 \times 10^6$ | 4.65 | $3.04 \times 10^7$ |
| 3 | $6.54 \times 10^6$ +$6.48 \times 10^6$ | 13.33 2.0 | $1.00 \times 10^8$ |

The irradiated samples were removed from the gamma ray field and the physical properties thereof were determined. Evaluation data were also obtained, for comparative purposes, on a sample which had not been irradiated. The results were as follows:

| | Irradiation Level, Roentgens | | | |
|---|---|---|---|---|
| | 0 | $1.01 \times 10^7$ | $3.04 \times 10^7$ | $1.00 \times 10^8$ |
| Flexural strength, p.s.i.[1] | [4] 3,103 | [4] 6,919 | 10,048 | 12,766 |
| Heat distortion temperature, ° F.[2] | 116 | 116 | 126 | 142 |
| Impact strength, Izod[3] | 0.59 | 0.47 | 0.38 | 0.28 |
| Density, grams/ml. | 1.060 | 1.060 | 1.072 | 1.107 |
| Shore D hardness | 78–9 | 79–80 | 84–5 | 86–7 |

[1] ASTM D790–45T.
[2] ASTM D648–45T.
[3] ASTM D256–47T; ft. lbs./in. notch.
[4] Maximum pull; sample did not break.

The foregoing data clearly show that the irradiated materials have greater flexural strength, a greater resistance to heat distortion, and a greater hardness than the unirradiated material. These properties are particularly valuable for some applications.

While the invention has been described in conjunction with present preferred embodiments, it should be evident that it is not limited thereto.

What is claimed is:

1. The method of producing a solid resin which comprises subjecting an epoxidized liquid polymer produced from conjugated dienes having from 4 to 12 carbon atoms per molecule, said polymer containing from $1/25$ to 1 oxirane oxygen atom per double bond of the original polymer, to from $10^5$ to $10^{11}$ roentgens of high energy ionizing radiation.

2. The method of claim 1 wherein the polymer is subjected to radiation at the rate of $10^3$ to $10^{10}$ roentgens per hour until the polymer receives a total of from $10^5$ to $10^{11}$ roentgens.

3. The method of claim 1 wherein the radiation is predominantly gamma rays.

4. The method of producing a solid resin which comprises subjecting an epoxidized liquid polymer produced from conjugated dienes, said polymer containing from $1/25$ to 1 oxirane oxygen atom per double bond, to from $10^5$ to $10^{11}$ roentgens of high energy ionizing radiation and heating the polymer to a temperature in the range of 70 to 400° F. for a period of from ½ to 48 hours.

5. The method of producing a solid resin which comprises subjecting a polymer prepared by polymerizing a mixture comprising at least 50 weight percent conjugated dienes, having from 4 to 12 carbon atoms per molecule, and which is epoxidized to the extent that from $1/25$ to 1 oxirane oxygen atom is present per double bond of the original polymer, to from $10^5$ to $10^{11}$ roentgens of high energy ionizing radiation.

6. The method of producing a solid resin which comprises subjecting a homopolymer of butadiene that is epoxidized to the extent that from $1/25$ to 1 oxirane oxygen atom is present per double bond of the original polymer to from $10^5$ to $10^{11}$ roentgens of high energy ionizing radiation.

7. The method of producing a solid resin which comprises subjecting a polymer prepared by polymerizing a mixture comprising at least 50 weight percent conjugated dienes having from 4 to 12 carbon atoms per molecule, and which is epoxidized to the extent that from $1/25$ to 1 oxirane oxygen atom is present per double bond of the original polymer, to from $10^5$ to $10^{11}$ roentgens of high energy ionizing radiation and heating the polymer to a temperature in the range of 70 to 400° F. for a period of from ½ to 48 hours.

8. The method of producing a solid resin which comprises subjecting an epoxidized polymer of a conjugated diene having a viscosity in the range of 100 to 6000 Saybolt Furol seconds at 100° F. and a molecular weight in the range of 300 to 3000 to from $10^5$ to $10^{11}$ roentgens of high energy ionizing radiation.

9. The method of producing a solid resin which comprises subjecting an epoxidized homopolymer of butadiene having a viscosity in the range of 100 to 6000 Saybolt Furol seconds at 100° F. and a molecular weight in the range of 300 to 3000 to from $10^5$ to $10^{11}$ roentgens of high energy ionizing radiation.

10. The method of producing a solid resin which comprises epoxidizing a liquid homopolymer of butadiene which has a viscosity of about 1500 Saybolt Furol seconds at 100° F. to produce an epoxidized resin containing about 6.7 weight percent oxirane oxygen and subjecting said epoxidized resin to from about $10^7$ to about $10^8$ roentgens of gamma ray radiation.

11. The method of claim 10 which further comprises maintaining the epoxidized resin at a temperature of about 100° C. for a period of about 16 hours prior to subjecting said resin to the gamma ray radiation.

References Cited in the file of this patent

UNITED STATES PATENTS

| | | |
|---|---|---|
| 2,763,609 | Lewis et al. | Sept. 18, 1956 |

FOREIGN PATENTS

| | | |
|---|---|---|
| 64,191 | France | May 18, 1955 |
| | (1st addition to No. 1,079,401) | |
| 66,034 | France | Dec. 12, 1955 |
| | (4th addition to No. 1,079,401) | |

OTHER REFERENCES

Little: "Nature," vol. 170, pp. 1075 and 1076, Dec. 20, 1952.

"Ind. and Eng. Chem.," vol. 45, pages 11A and 13A, September 1953.

AEC Document ORNL 1373, pp. 25, 26, 30, July 23, 1953.

Bovey: "Effects of Ionizing Radiation on Natural and Synthetic High Polymers," pp. 166–167 (1958).